(12) United States Patent
Sobanski

(10) Patent No.: US 9,607,452 B2
(45) Date of Patent: Mar. 28, 2017

(54) ELECTRONIC MODULE INTEGRATION FOR HARSH ENVIRONMENT MACHINES

(71) Applicant: UNITED TECHNOLOGIES CORPORATION, Farmington, CT (US)

(72) Inventor: Kurt J. Sobanski, Glastonbury, CT (US)

(73) Assignee: UNITED TECHNOLOGIES CORPORATION, Farmington, CT (US)

(*) Notice: Subject to any disclaimer, the term of this patent is extended or adjusted under 35 U.S.C. 154(b) by 0 days.

(21) Appl. No.: 14/691,910

(22) Filed: Apr. 21, 2015

(65) Prior Publication Data

US 2016/0314631 A1 Oct. 27, 2016

(51) Int. Cl.
*G07C 5/08* (2006.01)
*F01D 21/00* (2006.01)
*G05B 23/02* (2006.01)

(52) U.S. Cl.
CPC ......... *G07C 5/0808* (2013.01); *F01D 21/003* (2013.01); *G05B 23/0208* (2013.01); *F05D 2220/32* (2013.01); *F05D 2260/83* (2013.01); *F05D 2270/54* (2013.01); *F05D 2270/62* (2013.01)

(58) Field of Classification Search
CPC . G07C 5/0808; F01D 21/003; F05D 2260/83; F05D 2270/54; F05D 2270/62; F05D 2220/32
See application file for complete search history.

(56) References Cited

U.S. PATENT DOCUMENTS

| 5,381,314 A | 1/1995 | Rudy et al. |
| 6,195,247 B1 | 2/2001 | Cote et al. |
| 7,755,512 B2 | 7/2010 | Ziarno |
| 7,774,106 B2 | 8/2010 | Calandra et al. |
| 8,634,972 B2 | 1/2014 | Mathews, Jr. et al. |
| 2009/0281766 A1 | 11/2009 | Chan et al. |
| 2010/0288235 A1* | 11/2010 | Miller .................. F02D 41/3845 123/464 |
| 2011/0120075 A1 | 5/2011 | Diaz et al. |
| 2013/0125864 A1* | 5/2013 | Kannan ................ F02M 61/168 123/469 |
| 2013/0258583 A1 | 10/2013 | Balk et al. |
| 2014/0158091 A1* | 6/2014 | Petersen ................ F02M 69/46 123/456 |

(Continued)

OTHER PUBLICATIONS

Eurpean Search Report and Communication: Application No. 16166477.6-1802; Dated: Sep. 23, 2016; 8 pages.

*Primary Examiner* — Rodney Butler
*Assistant Examiner* — Frederick Brushaber
(74) *Attorney, Agent, or Firm* — Cantor Colburn LLP

(57) ABSTRACT

A gas turbine engine is provided having a control and health monitoring system that includes an engine control module. At least one electronic component electronically coupled to the engine control module. The at least one electronic component includes an electronic module. The system further includes an isolation rail extending through the gas turbine engine. The at least one control component is electronically coupled to the engine control module through the isolation rail. The electronic module is in thermal communication with isolation rail.

18 Claims, 7 Drawing Sheets

(56) References Cited

U.S. PATENT DOCUMENTS

2014/0216403 A1\* 8/2014 Stockner ............... F02M 69/08
  123/445
2014/0309909 A1\* 10/2014 McMahon .......... F02D 19/0628
  701/103

\* cited by examiner

ELECTRONIC MODULE INTEGRATION FOR HARSH ENVIRONMENT MACHINES

TECHNICAL FIELD OF THE DISCLOSED EMBODIMENTS

The present disclosures relate generally to a gas turbine engine and, more particularly, to electronic module integration for harsh environment machines.

BACKGROUND OF THE DISCLOSED EMBODIMENTS

Generally, control and health monitoring in harsh environments require robust electronic component and interconnect system designs. In systems such as gas turbine engines, constraints often apply to the allowable weight, cost and reliability of the interconnect system. These metrics are often traded during the design process to get the best result. As systems become more complex, the interconnect count between system components increases which also increases system complexity. With the increase in interconnects, troubleshooting systems do not always identify the contributing faulty components reliably in the event that system anomalies occur.

Difficulty in troubleshooting systems that have electronic components connected to control system devices such as actuators, valves or sensors arises from multiple potential sources for system faults. For example, a noisy signal in a sensor reading could be caused by a faulty interface circuit in the electronic component, a faulty wire or short in the cable system, or a faulty or intermittent sensor.

The time associated with identifying a faulty component quickly and accurately affects operational reliability, i.e. the ability to dispatch a flight on time. If the delay persists for too long, costly flight delays can occur. If the faulty component is identified improperly and returned to a supplier for testing, no faults will be found and the cost of the return will be wasted.

Another problem is that tracking usage on all control and health monitoring components is difficult. Typically, the electronics that can measure and record component faults are not part of the component that requires tracking. Separating the information from the component presents a logistics puzzle for maintainers that manage the parts and data. If component specific tracking information were available, it would hold significant value for the maintainer. The information could be used to predict impending failures and predict remaining life, even if the component were to be installed on several engines throughout the component's life.

Another issue is that to increase efficiency in gas turbine engines, component variability that contributes to system uncertainties needs to be reduced. One costly way to address uncertainties is to add cost with more expensive parts or tighter tolerances on existing designs. Another way would be to characterize a component during acceptance testing and store the characterization in memory for use by the control system in reading parameters or scheduling actuators. With typical systems, this approach is difficult because most control system components such as fuel controls, actuators and sensors do not typically contain on-board memory.

Additionally, electronic components experience temperatures that may vary over a wide range. For example, at a typical 35,000 feet (10668 meters) altitude, the ambient temperature will likely be approximately −65° F. On a hot day, the ambient temperature plus solar radiative heat may be approximately 190° F. at sea level static conditions. Military components can see even hotter temperatures due to ram air inlet conditions during flight. There are two damaging aspects of the varying thermal environment. The first damaging aspect is the temperature cycles between extreme cold ambient air temperatures and high temperatures caused by ambient conditions coupled with internal heating effects. These thermal cycles stress internal components and solder joints because of differences in their respective thermal expansion coefficients. The cycles happen during every engine flight. The second damaging aspect is that the extreme hot ambient air temperatures over extended periods along with internally generated heat may degrade electronics and eventually cause loss of wire bonding in integrated circuits or cracked solder joints on circuit boards. This can cause integrated circuits to malfunction at extreme high or low temperatures without immediate physical damage observable to the naked eye.

SUMMARY OF THE DISCLOSED EMBODIMENTS

In one aspect, a control and health monitoring system is provided having a control module. At least one control component is electronically coupled to the control module. The at least one control component includes an electronic module. The system further includes an isolation rail. The at least one control component electronically is coupled to the control module through the isolation rail. The electronic module is in thermal communication with isolation rail.

In a further embodiment of the above, the electronic module is physically coupled to an inside surface of the isolation rail.

In a further embodiment of any of the above, the electronic module is physically coupled to an outside surface of the isolation rail.

In a further embodiment of any of the above, the system further includes a thermal management unit configured and arranged to thermally condition the isolation rail.

In a further embodiment of any of the above, the system further includes at least one sensor electronically coupled to the control module through the isolation rail.

In a further embodiment of any of the above, the isolation rail is configured and arranged to protect the electronic module from at least one of vibration, shock, temperature extremes or thermal cycling stresses.

In a further embodiment of any of the above, the system further includes an external source of at least one of air, electrical power or fluid to thermally condition the isolation rail.

In a further embodiment of any of the above, the control module is electronically coupled to the electronic module with at least one of a data and power bus, optic cable, or a thermal path, the at least one of a data and power bus optic cable, a wireless transmission conduit, or a thermal path extending through the isolation rail.

In a further embodiment of any of the above, the isolation rail is configured and arranged as a waveguide for wireless communication between the control module and the control component.

In a further embodiment of any of the above, the electronic module comprises a memory device to store information related to at least one of diagnosing faults of the electronic component, environmental data during operation of the electronic component, or total accumulated operational time of the electronic component.

In a further embodiment of any of the above, the electronic module comprises dynamic models of the control component for at least one of real-time fault detection and remaining life calculation.

In a further embodiment of any of the above, the electronic module comprises functionality to control operation of the control component.

In a further embodiment of any of the above, the system further includes direct wiring between the control module and the electronic component without use of pin and socket connections for quick disconnect.

In one aspect, a gas turbine engine is provided having a control and health monitoring system that includes an engine control module. At least one electronic component electronically coupled to the engine control module. The at least one electronic component includes an electronic module. The system further includes an isolation rail extending through the gas turbine engine. The at least one control component is electronically coupled to the engine control module through the isolation rail. The electronic module is in thermal communication with isolation rail.

In a further embodiment of the above, the electronic module is physically coupled to at least one of an inside surface of the isolation rail or an outside surface of the isolation rail.

In a further embodiment of any of the above, the system further includes a thermal management unit configured and arranged to thermally condition the isolation rail.

In a further embodiment of any of the above, the isolation rail is configured and arranged to protect the electronic module from at least one of temperature extremes, vibration, shock, or thermal cycling stresses.

In a further embodiment of any of the above, the system further includes an external source of at least one of electrical power, air or fluid to thermally condition the isolation rail.

In a further embodiment of any of the above, the engine control module is electronically coupled to the electronic module with at least one of a power and data bus optic cable, or a thermal path, the at least one of a power and data bus optic cable, a wireless transmission conduit, or a thermal path extending through the isolation rail.

In a further embodiment of any of the above, the engine control module is coupled to the control component through a waveguide for wireless communication between the control module and the control component.

BRIEF DESCRIPTION OF THE DRAWINGS

The embodiments and other features, advantages and disclosures contained herein, and the manner of attaining them, will become apparent and the present disclosure will be better understood by reference to the following description of various exemplary embodiments of the present disclosure taken in conjunction with the accompanying drawings, wherein.

DETAILED DESCRIPTION OF THE DISCLOSED EMBODIMENTS

Figure 1:
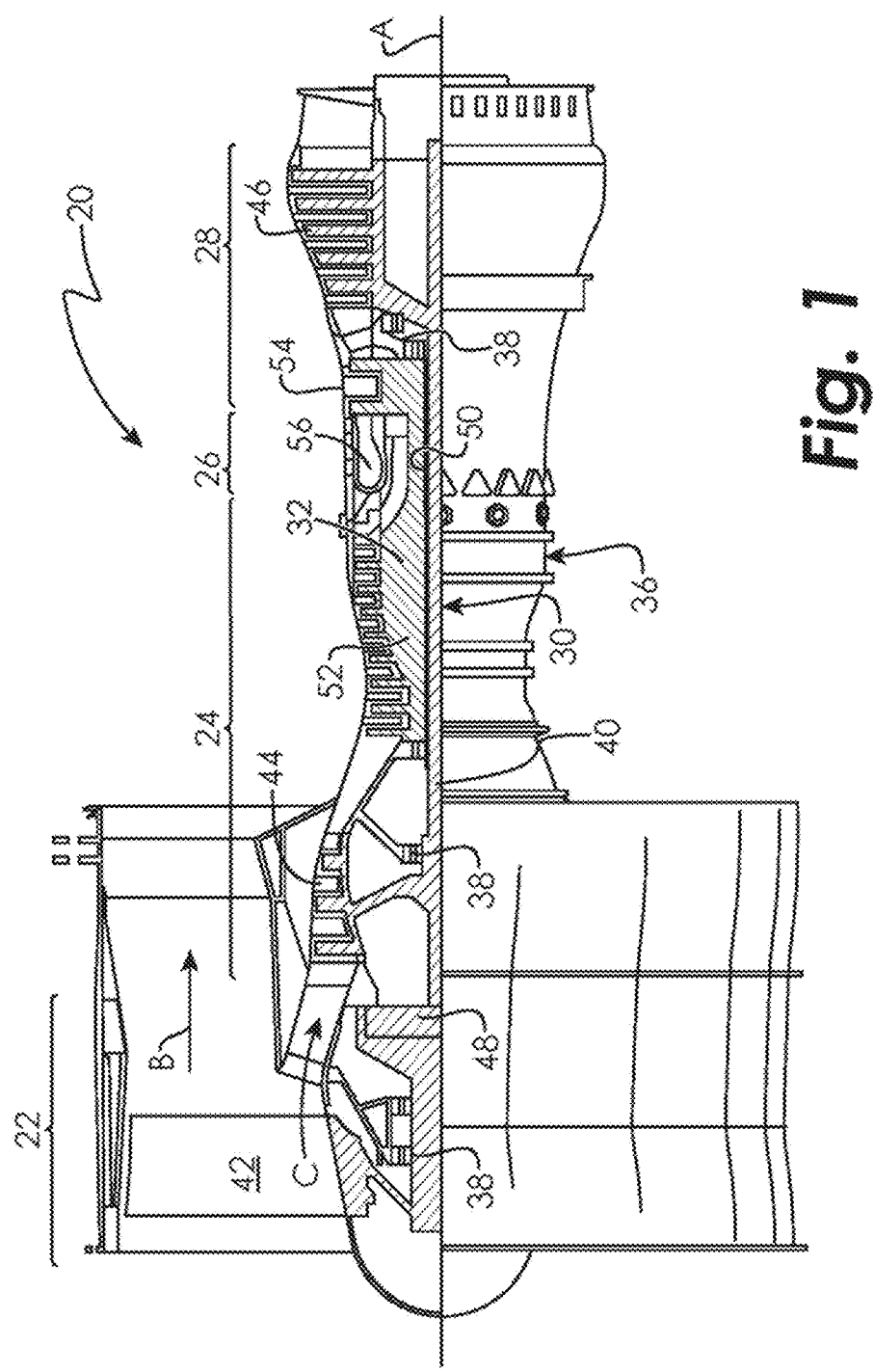
FIG. 1 is a sectional view of a gas turbine engine in an embodiment.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

FIG. 1 shows a gas turbine engine 20, such as a gas turbine used for power generation or propulsion, circumferentially disposed about an engine centerline, or axial centerline axis A. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft. (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram }°R)/(518.7°R)]^{0.5}$. The "Low corrected fan tip speed" as disclosed herein according to one non-limited embodiment is less than about 1150 ft/second (350.5 m/sec).

Figure 2:
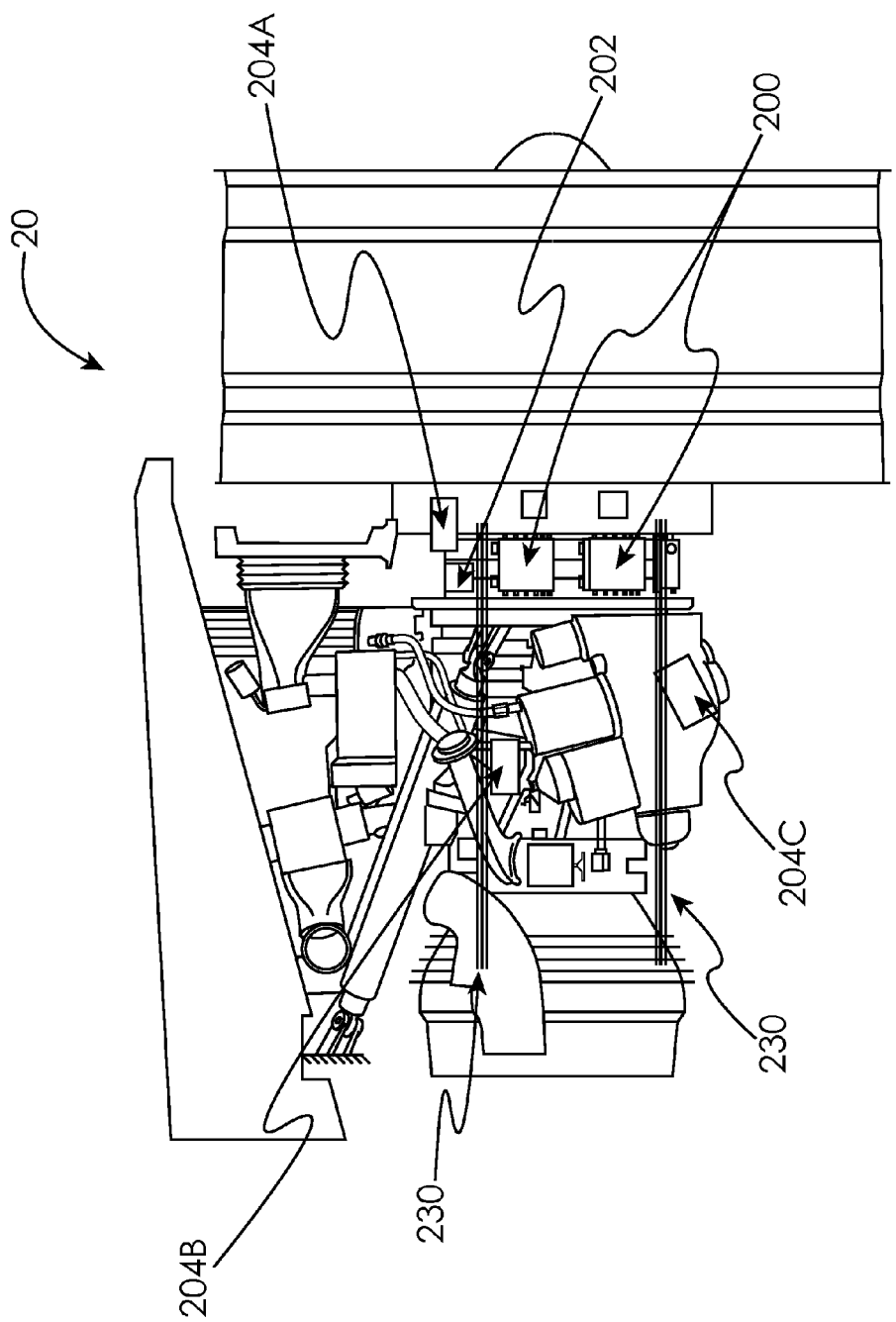
FIG. 2 is a sectional view of a gas turbine engine having an engine electronic component in accordance with an embodiment.

Referring to FIG. 2, the engine 20 includes an engine control module 200, for example a diagnostic, prognostic and health monitor, or a full authority digital engine control (FADEC), to name some non-limiting examples. In the illustrated embodiment, the engine control module 200 controls various fuel, hydraulic or pneumatic systems of the engine 20. In an embodiment, the engine control module 200 controls a thermal management unit 202 and a plurality of control components 204, i.e. a low compressor variable vane control 204A, a high compressor variable vane control 204B, and an integrated fuel management unit 204C, to name just some non-limiting examples.

Figure 3:
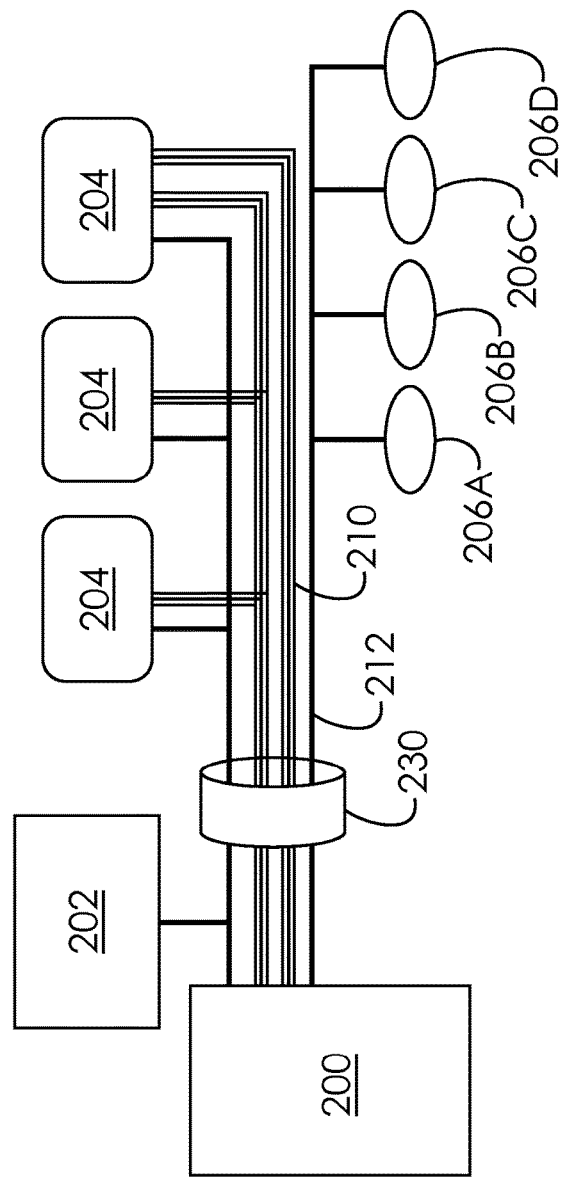
FIG. 3 is a schematic view of an engine electronic control and diagnostic system layout in a single channel configuration.

As illustrated in FIG. 3, the engine control module 200 may comprise a full authority digital engine control that sends and receives signals to and from the control component 204, such as through a power and data bus 210, or optic fiber 212, to name just some non-limiting examples. In an embodiment, the optic fiber 212 connects the engine control module 200 to various sensors 206, for example a speed sensor 206A, a pressure sensor 206B, a temperature sensor 206C, and a vibration sensor 206D. The sensors 206 may be located at various locations throughout the engine 20. In an embodiment, the sensors 206 provide feedback from the engine 20 to the engine control module 200. The engine control module 200 may utilize this feedback to control at least one of the thermal management unit 202 and/or at least one of the control components 204.

As illustrated in FIGS. 2 and 3, the engine control module 200 may be electronically connected to the control components 204 through at least one isolation rail 230 that extends through the engine 20. Additionally, the engine control module 200 may be electronically connected to the sensors 206 over the at least one isolation rail 230. In one embodiment, the power and data bus 210 and/or or optic fiber 212 may extend through the isolation rail 230.

Figure 4:
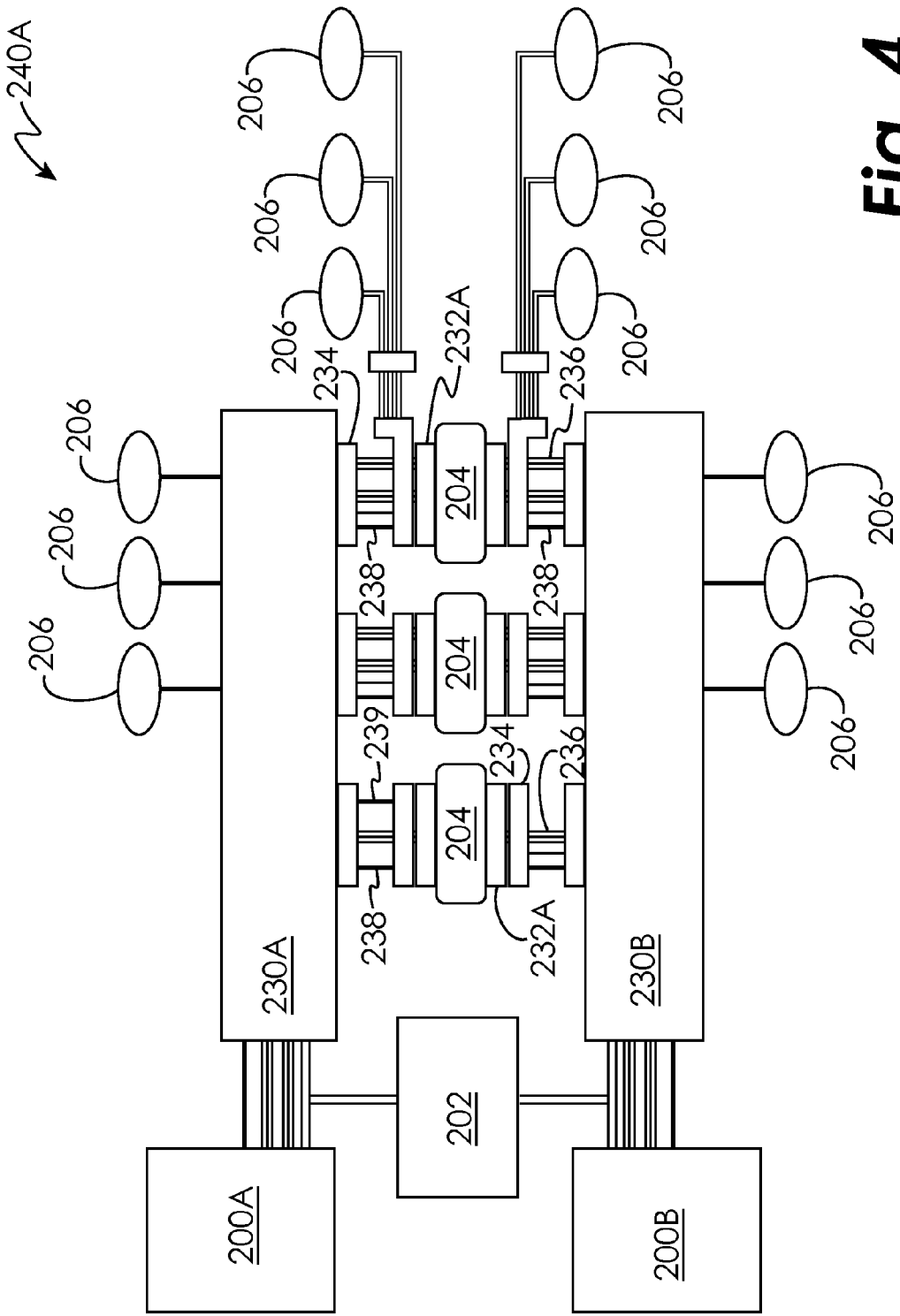
FIG. 4 illustrates a control and health monitoring system in accordance with an embodiment.

FIG. 4 illustrates a control and health monitoring system 240A. The control components 204 are each electronically coupled to a pair of engine control modules 200A and 200B. The control components 204 are electronically connected to the engine control module 200A through a first isolation rail 230A. The control components 204 are electronically connected to the engine control module 200B through a second isolation rail 230B. The engine control modules 200 connect to the control components 204 through at least one of a thermal conduit, a digital data and power bus, a wireless conduit, an optic fiber, and/or pneumatic connection that extends through the isolation rail 230. The thermal management unit 202 is coupled to both the isolation rail 230A and the isolation rail 230B. Alternately, a separate thermal management unit 202 may be provided for each isolation rail.

Figure 5:
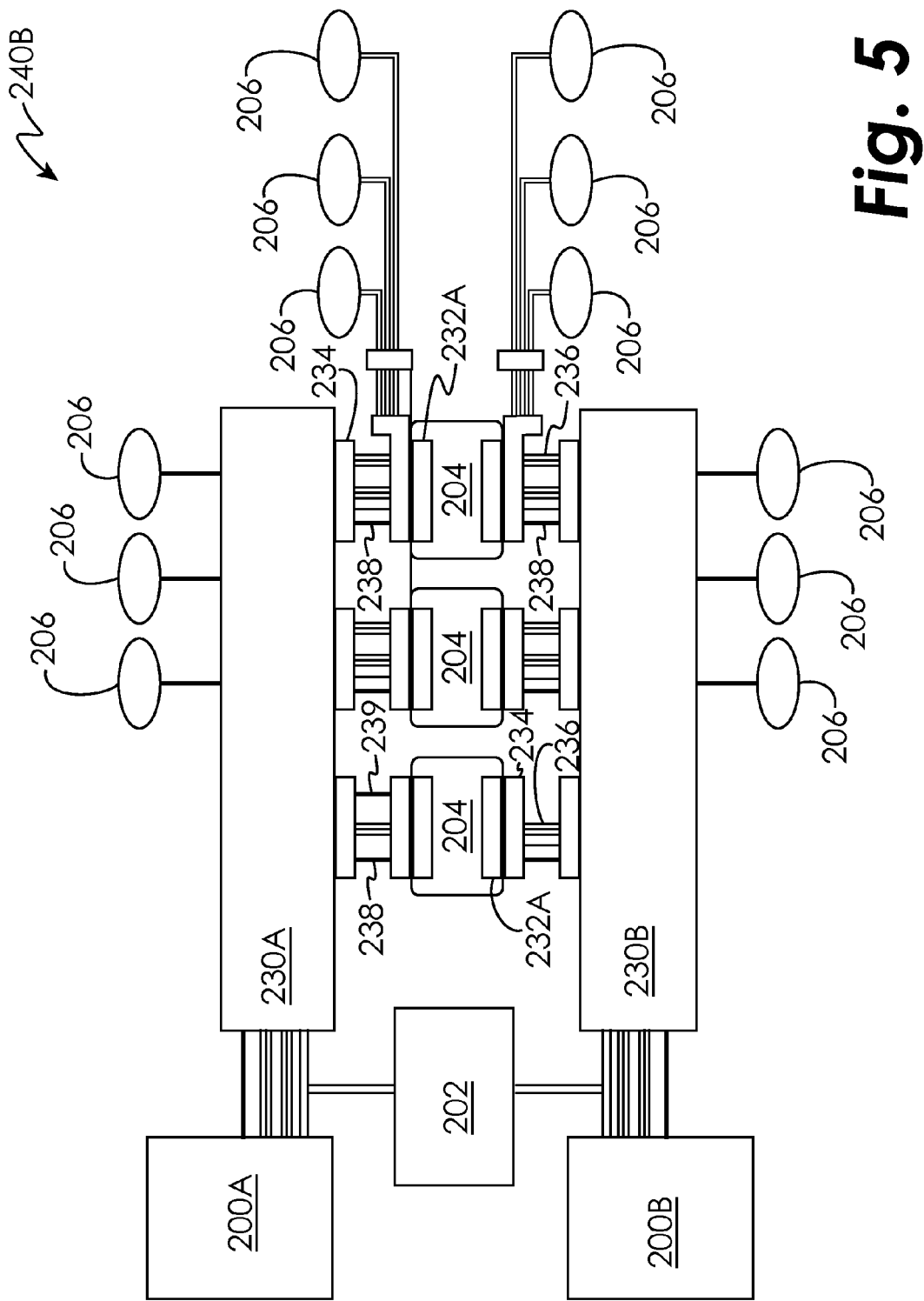
FIG. 5 illustrates a control and health monitoring system in accordance with an embodiment.

Each control component 204 includes electronic module 232A, to connect to engine control modules 200A and 200B. This provides one way to implement redundancy in the electronic modules to match redundant control modules 200A and 200B. In one embodiment, the electronic modules 232A include a memory device and optional processing system to store information related to at least one of diagnosing faults of the control component 204, environmental data during operation of the control component 204, or total accumulated operational time of the control component 204. In one embodiment, the electronic modules 232A include processing systems and dynamic models of the control component 204 for real-time fault detection and remaining life prediction. In one embodiment, the electronic modules 232A include processing systems to control operation of the control component. The electronic modules 232A therefore provide a location to control operation, store characterization data of the control component 204 in memory and predict remaining life for use by the engine control module. In the embodiment illustrated in FIG. 4, each of the electronic modules 232A are coupled to the respective control component 204. Each electronic module 232A is then electronically and/or electro-magnetically coupled to an isolation rail 230 through connectors 234, analog wire 236 and/or wireless conduit 239. A thermal conduit 238 optionally extends from the respective isolation rail 230 to the electronic modules 232A to provide thermal conditioning from the isolation rail 230 to the electronic modules 232A. Similar connections would also be represented in channel B to provide redundancy by duplicating components. A first plurality of sensors 206 is electronically coupled to a first electronic module 232A. The first plurality of sensors 206 may include a speed sensor, a pressure sensor, a temperature sensor, and/or a vibration sensor. Additionally, a second plurality of sensors 206 is electronically coupled to a second electronic module 232A. The second plurality of sensors 206 may include a speed sensor, a pressure sensor, a temperature sensor, and/or a vibration sensor. FIG. 4 illustrates a control and health monitoring system 240B, wherein each electronic module 232A is positioned within contact of the external surface of the respective control component 204. FIG. 5 illustrates a control and health monitoring system 240B, wherein each electronic module 232A is positioned within the respective control component 204.

Figure 6:
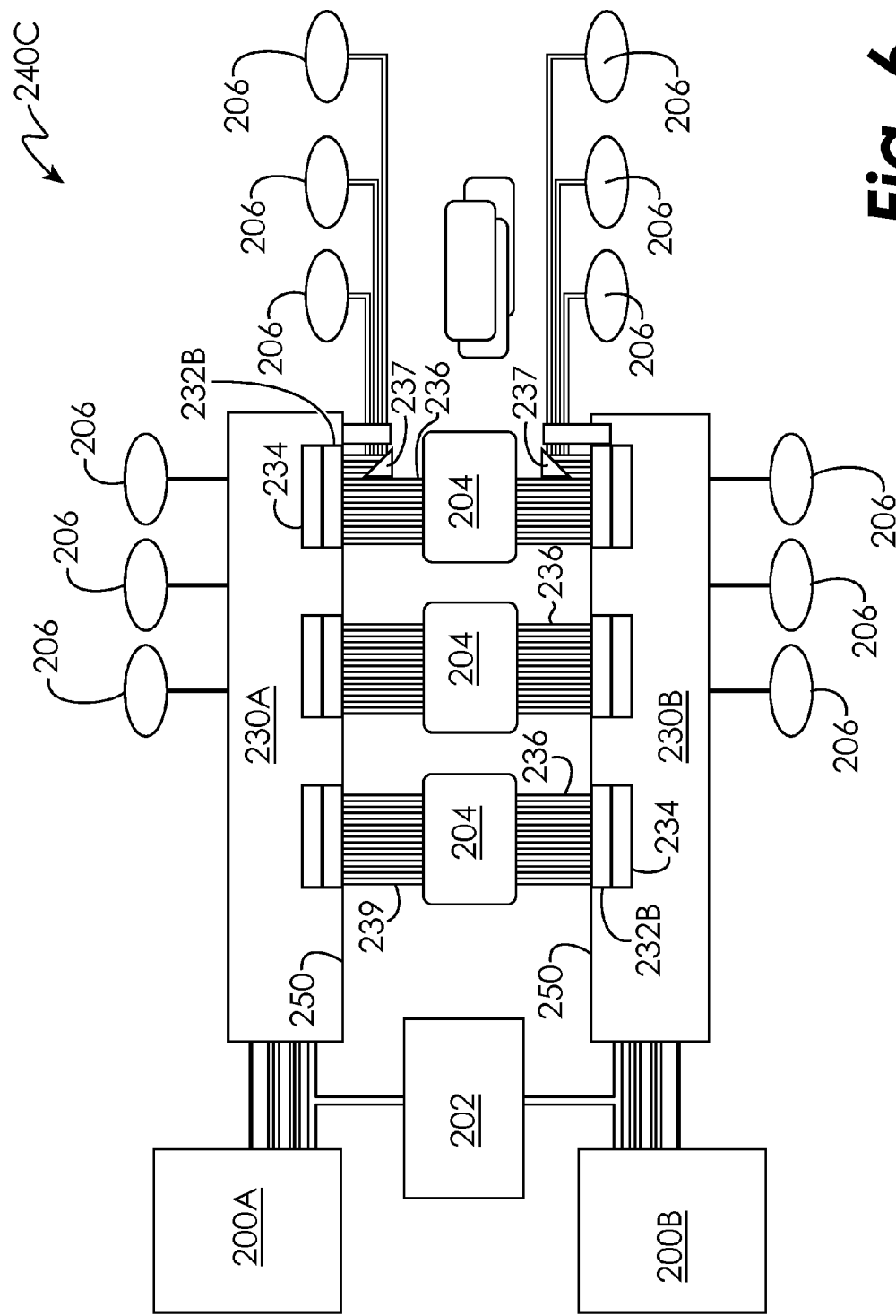
FIG. 6 illustrates a control and health monitoring system in accordance with an embodiment.

FIG. 6 illustrates a control and health monitoring system 240C. The control components 204 are each electronically coupled to a pair of engine control modules 200A and 200B. The control components 204 are electronically connected to the engine control module 200A through a first isolation rail 230A. The control components 204 are electronically connected to the engine control module 200B through a second isolation rail 230B. The engine control modules 200 connect to the control components 204 through at least one of a thermal conduit, a digital data and power bus, a wireless conduit, an optic fiber, and/or pneumatic connection that extends through the isolation rail 230.

Figure 7:
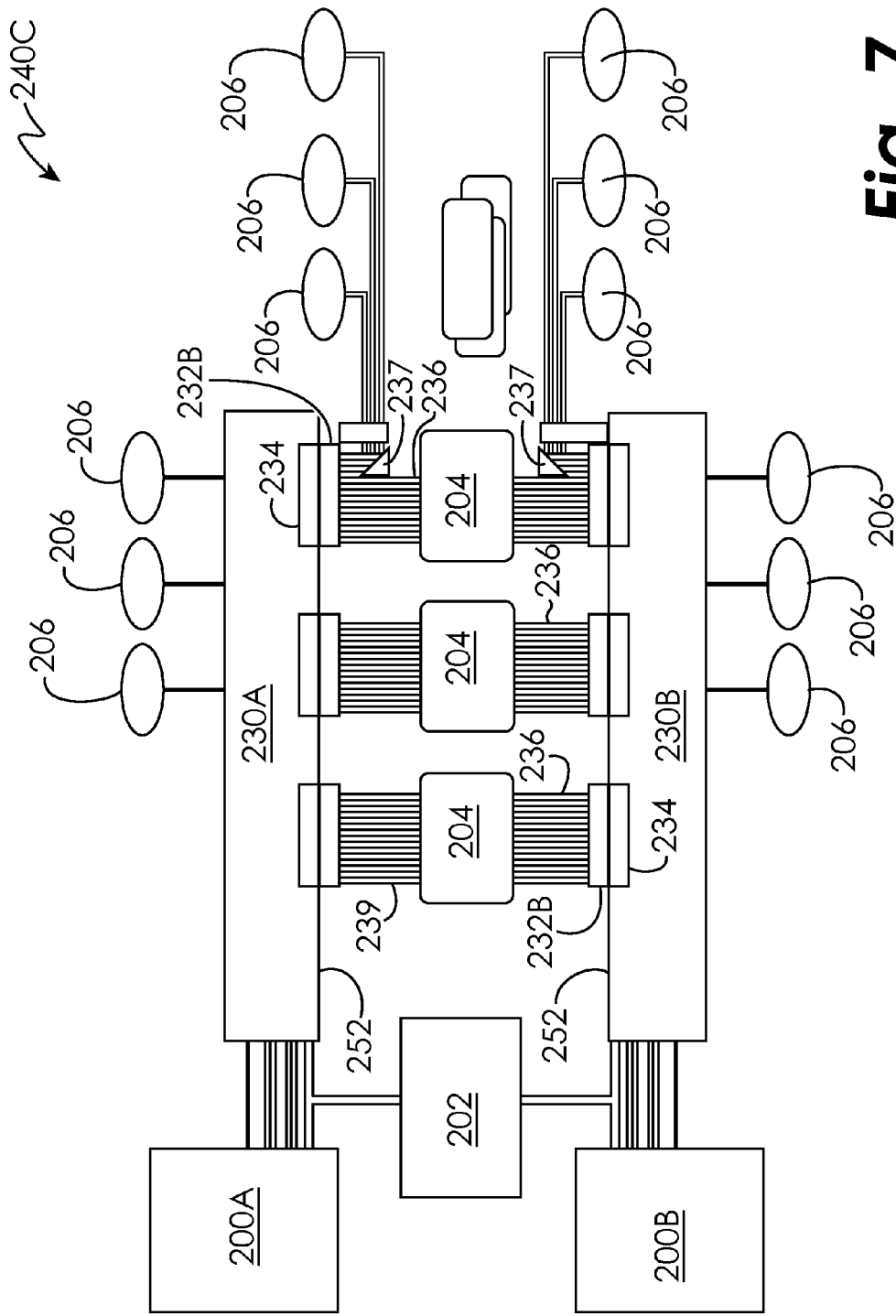
FIG. 7 illustrates a control and health monitoring system in accordance with an embodiment.

Each control component 204 includes an electronic module 232B, to connect to engine control modules 200A and 200B. In the embodiment illustrated in FIG. 6, each electronic module 232B is positioned within the inner surface 250 of the respective isolation rail 230. Each electronic module 232B is electronically coupled to the respective isolation rail 230 through connectors 234. Each electronic module 232B is coupled to the respective control component via analog wire 236 and wireless conduit 239. The thermal management unit 202 is coupled to both the isolation rail 230A and the isolation rail 230B. The electronic modules 232B are thermally conditioned by the respective isolation rail 230. A first plurality of sensors 206 is electronically coupled to a first electronic module 232B. Additionally, a second plurality of sensors 206 is electronically coupled to a second electronic module 232B. FIG. 7 illustrates a control and health monitoring system 240D, wherein each electronic module 232B is positioned on the outer surface 252 of the respective isolation rail 230.

In one embodiment, pin-socket connections may be reduced by wiring directly to control component 204, as shown in FIGS. 6-7. In such an embodiment, signals internal to the control component 204 are wired directly to the electronic module 232B through a flexible wiring circuit that connects directly to the electronic module 232B without any pin to socket connections that provide mating or unmating capability.

In one embodiment, a control and health monitoring system 240 is provided having a control module 200. At least one control component 204 is electronically coupled to the control module 200, the at least one control component 204 includes an electronic module 232. An isolation rail 230 is provided. The at least one control component 204 is electronically coupled to the control module 200 through the isolation rail 230. In one embodiment, the electronic module 232 is in thermal communication with the isolation rail 230. In one embodiment, the electronic module 232 is physically coupled to an inside surface 250 of the isolation rail 230. In one embodiment, the electronic module 232 is physically coupled to an outside surface 252 of the isolation rail 230. In one embodiment, the system includes an external source 202 of at least one of air, electrical power or fluid to thermally condition the isolation rail 230. In one embodiment, the system 240 includes a thermal management unit 202 to thermally condition the isolation rail 230. In one embodiment, the system 240 includes at least one sensor 206 electronically coupled to the electronic module 232. In one embodiment, the isolation rail 230 is configured and arranged to protect the electronic module 232 from at least one of vibration, shock, extreme temperatures or thermal cycling stresses. In one embodiment, the control module 200 is electronically coupled to the control component 204 with at least one of a power & data bus, optic cable, a wireless transmission conduit, or a thermal path, or at least one of a power & data bus, optic cable, a wireless transmission conduit, or a thermal path extending through the isolation rail 230. In one embodiment, the isolation rail 230 is configured and arranged as a waveguide for wireless communication between the control module 200 and the control component 204. In one embodiment, the electronic module 232 includes a memory device to store information related to at least one of diagnosing faults of the control component 204, environmental data during operation of the control component 204, or total accumulated operational time of the control component 204. In one embodiment, the electronic module 232 comprises dynamic models of the control component 204 for real-time fault detection. In one embodiment, the system 240 includes direct wiring between the electronic module 232 and the control component 204. In one embodiment, the electronic module 232 comprises processing system to control operation of the control component.

Typical control and health monitoring systems used on harsh environment machinery often employ a centralized engine control module that communicates over wires to electronic components in the system. Machines may include, but not be limited to, engines of any type, automobiles or any equipment with mechanical or electrical hardware. Typical characteristics include, but are not limited to, a predominantly centralized architecture in which the processing functions reside in the engine control module; redundancy to accommodate failures and continue system operation (systems are often dual channel with functionality replicated in both control channels); actuator and sensor communication accomplished through analog wiring for power, command, position feedback, sensor excitation and sensor signals; cables and interconnect with shielding that are typically custom designed and routed around major system components; electronic system protection from environmental impacts such as vibration, thermal loads and electromagnetic interference; centralized electronic enclosures that may or may not be thermally conditioned with liquids or air; and system components that are usually located in harsh environments (temperature, pressure, vibration).

Some of the present embodiments provide a method for connecting multiple control components 204 using isolation rails 230 with mechanical, electrical, optic, wireless and/or thermal management channels. Some of the embodiments shown herein are applicable to multiple configurations of machines operating in a harsh environment. Some of the embodiments described herein provide a reduced size control and health management system. Some of the embodiments described herein provide multiple actuators communicated to over a power and data bus as a method for reducing actuation input and output signals. Some of the embodiments described herein provide multiple sensors 206 used for control feedback or diagnostic measures of system operation. In some embodiments, the sensors 206 include, but are not limited to, speed sensors, pressure sensors, temperature sensors, vibration sensors, proximity sensors, emissions sensors, and particle detection sensors. Some of the embodiments described herein provide a control and health management system 240 that may use redundant inputs and outputs with a single channel or multiple channels. Some of the embodiments described herein may use cross channel data links for redundant systems. Some of the electronic modules described in FIGS. 4-7 may include functionality such as, but not be limited to, power conversion, transient protection, serial data buses, processing, memory, data bus interfaces, analog to digital conversion, digital to analog conversion, current drivers, or discrete inputs and outputs.

In some of the embodiments described herein, a thermal management unit 202 may be used to provide a thermal conditioning medium to the electronic modules 232. Some of the embodiments described herein utilize isolation rails 230 to house, support, and protect the thermal management unit flowpath, a power and data bus, an optic fiber and a wireless conduit. In the exemplary embodiments, the isolation rails 230 are depicted as straight and narrow; however, any shape is possible as will be appreciated by one of skill in the art. In one embodiment, a thermal management unit path may implement the wireless conduit as a waveguide for acoustic, wireless or optic energy. Optional connectors on the sides of the electronic module 232 may be used to integrate control components 204 that are not directly wired to electronic module 232.

The embodiments shown in FIGS. 4-7 tie the electronic module 232 to the control component 204 such that memory devices in the electronic module 232 can characterize each control component 204 because they are the same line replaceable unit. In at least one embodiment, for example the embodiments shown in FIGS. 6-7, the electronic modules 232 are pigtailed to the control components 204 for a direct connection to eliminate pin and socket connections. In one embodiment, the characterization data contained in the electronic module 232 may include, but not be limited to, component serial number, calibration curves, engine serial number, date, operating times, and multiple parameter accumulated values for temperature, speed, pressure and vibration. In one embodiment, environmental data may be utilized to predict component failures or remaining life. Either approach may utilize the thermal management unit's 202 output to condition the temperature for the electronic modules 232.

In one embodiment, the electronic module 232 may contain software models of the control component 204 in order to compare operating parameters to the model for early fault detection or remaining life prediction. In one embodiment, the electronic module 232 may be attached externally to or inserted into the isolation rail 230, as shown in FIGS. 6 and 7, respectively. Insertion into the isolation rail 230 may provide additional environmental isolation for the electronic module 232 from the local harsh environment. In one embodiment, optic fibers within the isolation rail 230 may contain sensor elements 206 which are pneumatically connected to pressure measurement points. In one embodiment, optic fibers within the isolation rail 230 may contain optic splitters to branch out to sensors 206 outside the channel through optic quick disconnect interfaces 237, as shown in FIG. 7. In one embodiment, the wireless conduit communicates with wireless sensors embedded in the control component 204 or other engine locations. In one embodiment, thermal radiation shielding and thermal insulation may be provided for the control component 204 and electronic module 232 to protect them from temperature extremes during flight or ground operations. In one embodiment, thermal conditioning provided by the thermal management unit 202 may mitigate the need for higher cost high temperature electronics. The embodiments described herein may utilize high temperature electronics to provide added protection from temperature extremes.

While the invention has been illustrated and described in detail in the drawings and foregoing description, the same is to be considered as illustrative and not restrictive in character, it being understood that only certain embodiments have been shown and described and that all changes and modifications that come within the spirit of the invention are desired to be protected.

What is claimed is:

1. A control and health monitoring system comprising:
   a control module;
   at least one control component electronically coupled to the control module, the at least one control component comprising an electronic module;
   an isolation rail, the at least one control component electronically coupled to the control module through the isolation rail, wherein the electronic module is in thermal communication with isolation rail,
   wherein the control module is electronically coupled to the electronic module with at least one of a data and power bus, optic cable, or a thermal path, the at least one of a data and power bus optic cable, a wireless transmission conduit, or a thermal path extending through an interior pathway of the isolation rail.

2. The system of claim 1, wherein the electronic module is physically coupled to an inside surface of the isolation rail.

3. The system of claim 1, wherein the electronic module is physically coupled to an outside surface of the isolation rail.

4. The system of claim 1 further comprising a thermal management unit operably connected to the isolation rail to thermally condition the isolation rail.

5. The system of claim 1 further comprising at least one sensor electronically coupled to the control module through the isolation rail.

6. The system of claim 1, wherein the isolation rail is configured and arranged to protect the electronic module from at least one of vibration, shock, temperature extremes or thermal cycling stresses.

7. The system of claim 1 further comprising an external source of at least one of air, electrical power or fluid to thermally condition the isolation rail.

8. The system of claim 1, wherein the isolation rail is configured and arranged as a waveguide for wireless communication between the control module and the control component.

9. The system of claim 1, wherein the electronic module comprises a memory device to store information related to at least one of diagnosing faults of the electronic component, environmental data during operation of the electronic component, or total accumulated operational time of the electronic component.

10. The system of claim 1, wherein the electronic module comprises dynamic models of the control component for at least one of real-time fault detection and remaining life calculation.

11. The system of claim 1, wherein the electronic module comprises functionality to control operation of the control component.

12. The system of claim 1, further comprising direct wiring between the control module and the electronic component without use of pin and socket connections for quick disconnect.

13. A gas turbine engine comprising:
    a control and health monitoring system comprising:

an engine control module;
at least one electronic component electronically coupled to the engine control module, the at least one electronic component comprising an electronic module;
an isolation rail extending through the gas turbine engine, the at least one control component electronically coupled to the engine control module through the isolation rail, wherein the electronic module is in thermal communication with isolation rail,
wherein the engine control module is electronically coupled to the at least one control component with at least one of a data and power bus, optic cable, or a thermal path the at least one of a data and power bus optic cable a wireless transmission conduit or a thermal path extending through an interior pathway of the isolation rail.

14. The gas turbine engine of claim 13, wherein the electronic module is physically coupled to at least one of an inside surface of the isolation rail or an outside surface of the isolation rail.

15. The gas turbine engine of claim 13 further comprising a thermal management unit operably connected to the isolation rail to thermally condition the isolation rail.

16. The gas turbine engine of claim 13, wherein the isolation rail is configured and arranged to protect the electronic module from at least one of temperature extremes, vibration, shock, or thermal cycling stresses.

17. The gas turbine engine of claim 13 further comprising an external source of at least one of electrical power, air or fluid to thermally condition the isolation rail.

18. A gas turbine engine comprising:
a control and health monitoring system comprising:
an engine control module;
at least one electronic component electronically coupled to the engine control module, the at least one electronic component comprising an electronic module;
an isolation rail extending through the gas turbine engine, the at least one control component electronically coupled to the engine control module through the isolation rail, wherein the electronic module is in thermal communication with isolation rail;
wherein the engine control module is coupled to the control component through a waveguide for wireless communication between the control module and the control component.

* * * * *